July 3, 1962 W. G. WELCHMAN ETAL 3,042,199
DATA PROCESSING SYSTEM
Filed Sept. 23, 1960 4 Sheets-Sheet 1
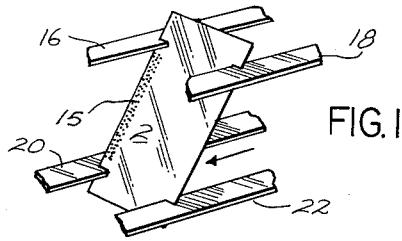
FIG. 1
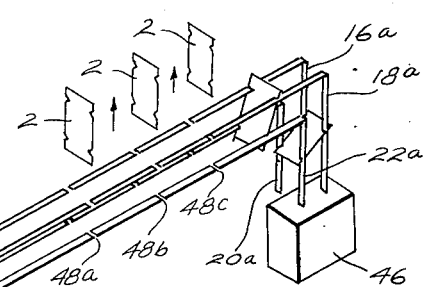
FIG. 3
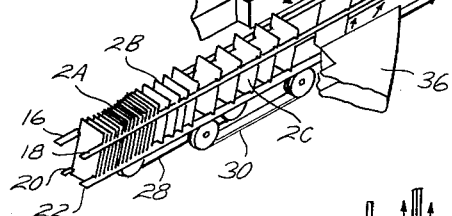
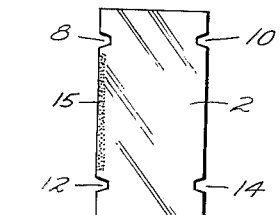
FIG. 2
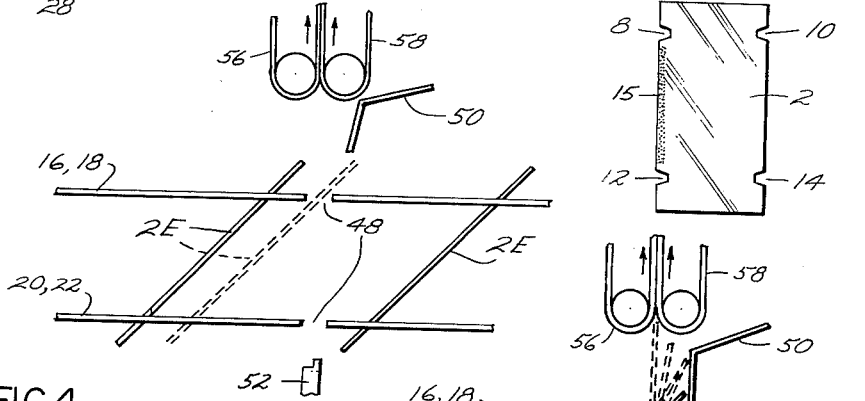
FIG. 4
FIG. 5
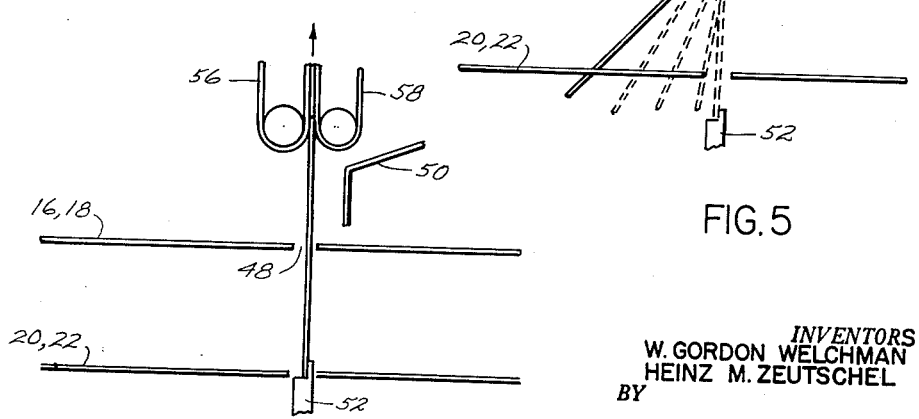
FIG. 6
*INVENTORS*
W. GORDON WELCHMAN
HEINZ M. ZEUTSCHEL
BY
Weingarten, Orenbuch & Pandiscio
ATTORNEYS July 3, 1962    W. G. WELCHMAN ETAL    3,042,199
DATA PROCESSING SYSTEM
Filed Sept. 23, 1960    4 Sheets-Sheet 2

INVENTORS
W. GORDON WELCHMAN
HEINZ M. ZEUTSCHEL
BY
ATTORNEYS

July 3, 1962 W. G. WELCHMAN ETAL 3,042,199
DATA PROCESSING SYSTEM
Filed Sept. 23, 1960 4 Sheets-Sheet 3
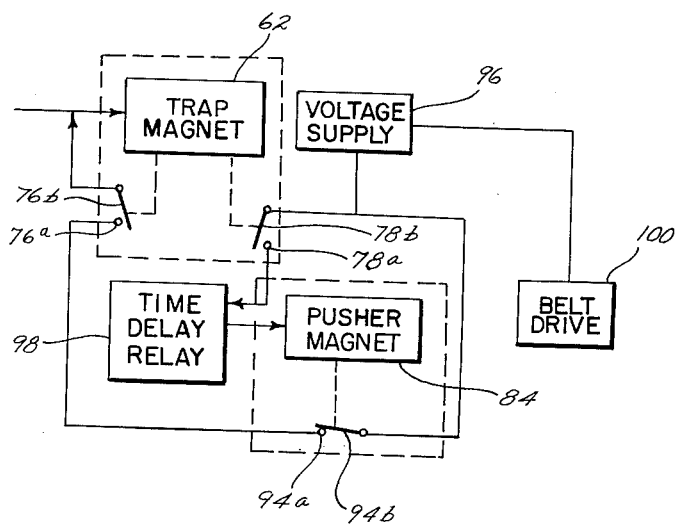
FIG. 9
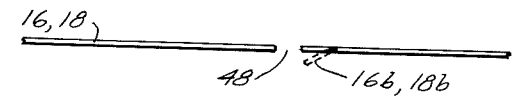
FIG. 10
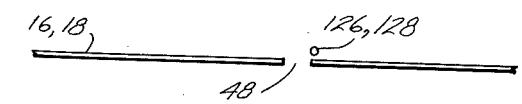
FIG. 11
INVENTORS
W. GORDON WELCHMAN
HEINZ M. ZEUTSCHEL
BY
Weingarten, Ovenbuch & Pandiscio
ATTORNEYS

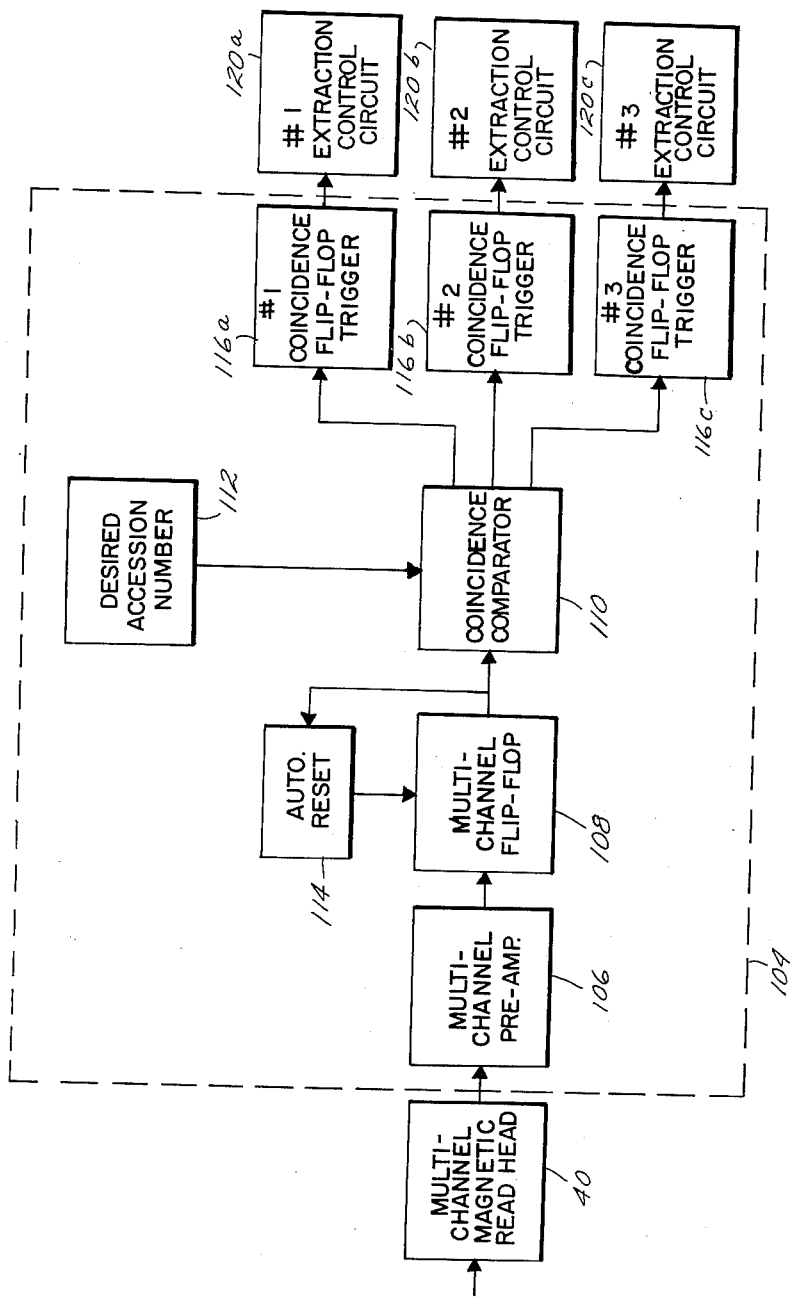

United States Patent Office 3,042,199
Patented July 3, 1962

3,042,199
DATA PROCESSING SYSTEM
W. Gordon Welchman, Lexington, and Heinz M. Zeutschel, West Newton, Mass., assignors to Itek Corporation, Waltham, Mass., a corporation of Delaware
Filed Sept. 23, 1960, Ser. No. 58,114
18 Claims. (Cl. 209—73)

This invention relates to data processing systems and more particularly to an improvement in data processing systems of the type having a plurality of parallel guide elements along which are transported pneumatically a plurality of data-bearing sheets which are processed according to a predetermined instruction program.

This invention is an extension of and an improvement on the system illustrated, described, and claimed in the co-pending application of W. Gordon Welchman, Serial No. 38,334, filed June 23, 1960, for Data Processing Apparatus assigned to the same assignee as the present invention. Described briefly, the Welchman system consists of a plurality of guide rails, preferably four, along which data bearing sheets such as film chips are transported pneumatically. These film chips are provided with identifying codes, preferably magnetically recorded, which are sensed by a transducer. According to the description in the Welchman application, selected film chips may be isolated and projected onto a screen without removal from the system or may be extracted from the system for use in a separate environment.

The primary object of the present invention is to provide means for extracting from the guide rail system a film chip which has been determined to have a particular identifying code or to contain desired data for subsequent processing.

A more specific object of the present invention is to provide means situated along a guide rail system for blocking a film chip at a given location along its path of movement and for thereafter ejecting said film chip from the guide rail system through slots provided in the guide rails.

Other objects and many of the attendant advantages of the present invention will become more readily understood and appreciated as reference is had to the following detailed specification when considered together with the accompanying drawings wherein:

FIG. 1 is a perspective view showing a typical film chip positioned on four parallel rails which form part of a four-rail data processing system;

FIG. 2 is a front elevation of a typical film chip;

FIG. 3 is a schematic representation of a portion of the data processing system described and illustrated in the aforementioned Welchman application Serial No. 38,334;

Figure 7:
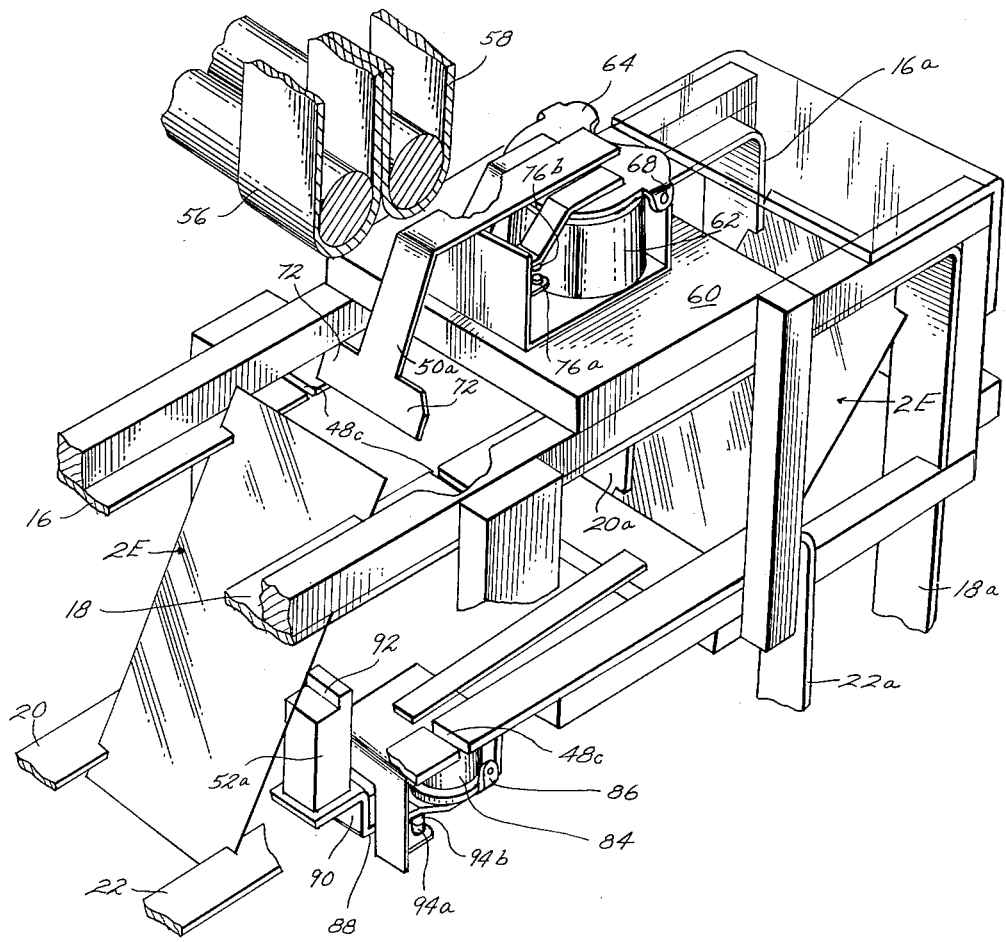
Figure 12:
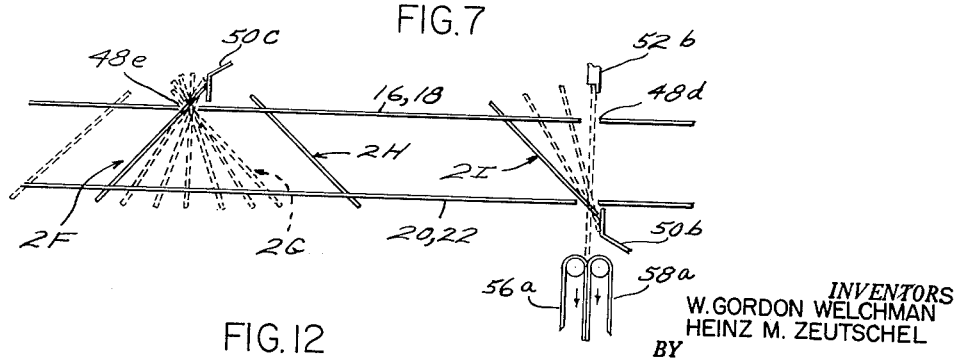

FIGS. 4, 5, and 6 schematically illustrate how a film chip is extracted from the guide rail system according to the present invention;

FIG. 7 is a perspective view of apparatus constructed according to the present invention for (1) stopping a travelling film chip and (2) ejecting it from the guide rail system;

FIG. 8 is a block diagram of the logic and electrical control stages of a data processing device embodying the present invention;

FIG. 9 is a block diagram of one form of control circuit for a film chip extraction unit;

FIG. 10 schematically illustrates another way to trap the film chip along its path of movement;

FIG. 11 shows a third way of trapping a film chip moving along the guide rails; and FIG. 12 illustrates (a) how a chip may be flipped over so that its bottom end rather than its top end is in leading position and (b) how a chip is extracted in a downward rather than an upward direction.

Referring now to FIGS. 1, 2, and 3, the Welchman system makes use of a data-bearing sheet 2 of rectangular configuration having four notches, 8, 10, 12, and 14 cut in its two elongated side edges. Although not visible, it is to be understood that the sheet is capable of carrying data in a form suitable for reproduction and/or direct readout. In the preferred embodiment of the invention, the data-bearing sheet 2 is a segment of film commonly called a "film chip" on which data can be recorded in the form of discrete negative images. Also in the preferred embodiment, the data-bearing sheet 2 bears an identifying code which is magnetically recorded in a magnetic striping 15 which is applied along one edge of the data-bearing sheet. Although not shown, it is to be understood that a second magnetic striping may be applied along the opposite edge of sheet 2. The notches 8, 10, 12, 14 formed in the data-bearing sheets are for the purpose of accommodating guide rails generally identified as 16, 18, 20, and 22, respectively. Sections of these guide rails are illustrated in FIG. 1. The top guide rails 16 and 18 are so disposed with respect to the bottom guide rails 20 and 22 that a data-bearing sheet 2 can be accommodated simultaneously by all four rails only if oriented at an inclined angle. Preferably, the spacing between the top and bottom rails is such that when a data-bearing sheet is supported on the guide rails, the sheet will be maintained at an angle of approximately 45°.

The size of the slots is such as to substantially eliminate up and down or side play relative to the guide rails while at the same time permitting the data-bearing sheets to be moved along the rails at a high rate of speed under the influence of a relatively small air pressure gradient.

The system schematically represented in FIG. 3 is adapted to accommodate a supply of film chips generally identified as 2A. These film chips are slipped onto the rails and positioned so as to be picked up by a belt 28 which is moving at a relatively low rate of speed. Preferably, but not necessarily, the supply of film chips 2A is disposed so that belt 28 will pick up one chip at a time, whereby they will undergo an initial separation as shown at 2B. These chips are then picked up by a belt 30 which is moving at a speed substantially higher than belt 28 and which also is disposed in overlapping relation with belt 28. Accordingly, belt 30 functions to increase the spacing between the chips, as indicated at 2C. The chips advanced by the high speed belt 30 are directed between two air ducts 34 and 36 which feed air into the guide rail system in such a manner as to pick up each chip in turn and send it zooming down the guide rails. Due to a great difference in velocity between the belt 30 and the air stream, the chips become spaced apart to an even greater degree, as indicated at 2D. The manner in which this is accomplished is explained in more complete detail in the aforementioned Welchman application. As the chips are propelled down the rails, they pass a transducer 40 which is located so as to read the identifying code recorded on the magnetic striping 15. The transducer is connected to a logic system which produces an output signal each time a desired code is detected. This output signal is used to control apparatus which is designed to perform a selected function with respect to a chip having the desired code. In the aforementioned Welchman system, the output signal is used to control an optical system which is claimed in the copending application of Heinz M. Zeutschel, Serial No. 42,356, filed July 12, 1960, for Optical Projection System assigned to the same assignee as the present invention. This optical system is designed to stop a chip at a given point in its path of travel and to project the chip onto a suitable screen so that the data images in the chip may be observed and read or reproduced. Suitable means are also provided for stopping all chips upstream of a selected chip, pending utilization of the selected chip. The optical system and the means for stopping chips upstream of the selected chip are not shown or described herein. However, reference may be had to the aforementioned Welchman and Zeutschel applications for specific details. All sheets which are maintained in the system, are delivered to a suitable output station. In FIG. 3 this output station is indicated as a box-like container 46 which is disposed beneath downwardly oriented extensions 16a, 18a, 20a, and 22a of the four-rail system. It is a distinctive feature of the Welchman system that chips may be made to negotiate a 90° turn on the tracks. Such a turn is accomplished by chips in the system of FIG. 3 as they travel from tracks 16—22 to the container 46 via extensions 16a—22a.

It has been determined that if gaps are made in the upper and lower rails at substantially the same point, a chip travelling along at an inclined angle will jump the gaps without any difficulty. However, if the gaps in the bottom rails are offset from the gaps in the upper rails, by suitable trapping or deflecting elements, a chip may be made to jump out of the four-rail system. The gaps in the bottom rails must be displaced from the gaps in the top rails at the same angle at which the chip is oriented, i.e. 45°, in order for this to be accomplished at a high rate of speed.

The present invention makes use of the principle that if the gaps are located one above the other, the chips will jump the gaps unless they are caused to do otherwise. Thus, in normal operation, chips travelling along the guide rails will encounter no difficulty. In FIG. 3, for example, there are illustrated three sets of gaps 48a, b, and c. Unless extraction means are provided, data-bearing sheets will jump the gaps with no difficulty. On the other hand, if an extraction mechanism such as the type hereinafter described is provided at each of the gaps, data-bearing sheets can be caused to be removed from the four-rail system at will, the extracted sheets being directed upwardly through selected gaps as indicated in FIG. 3.

FIGS. 4, 5, and 6 illustrate the principles and mode of operation of the present invention. In these figures, numerals 16, 18, 20 and 22 are used again to identify the upper and lower tracks since these elements do not change. The data-bearing sheets are identified as 2E.

The extraction mechanism of the present invention comprises three different units. The first unit is a trapping element which consists of a finger 50 located above the top rails. Finger 50 is located at such a height that the upper edges of the film chips will readily pass beneath the bottom end of the finger. On the other hand, with a short stroke, the finger 50 can be made to intercept a chip moving along the rails. The second element of the invention is a pusher element generally identified at 52. This pusher element is located below the gaps in the bottom rails. Normally, the pusher element is in a down position and, in this position, the pusher element presents no obstacle to sheets moving along the guide rails. However, when the finger 50 has been moved down to a film-trapping position, the film which is trapped will be caused to pivot (as illustrated in FIG. 5) and to begin to move up through the gaps in the top rails. As this occurs, the bottom edge of the trapped film chip will follow an arcuate path which causes it to reach its lowest position when the chip is vertical and is in the gaps in the top and bottom rails. At this point, the bottom edge of the trapped sheet will engage the pusher element 52 and will be blocked from rotating counter-clockwise past six o'clock position. Thereafter the pusher element is moved upward, causing the film chip to be thrust up through the gaps to an elevated position (FIG. 6) where it is grabbed by the third element of the extraction mechanism. This third element is a retrieval device which preferably comprises a pair of belts 56 and 58 which are so located that the nip formed by these two belts is in position to receive a film chip thrust up through the gaps by the pusher element 52. The trapped sheet is pulled up by the conveyor belts 56 and 58 and is transported by the latter to a predetermined destination or use point (not shown).

FIG. 7 provides details of a typical extraction stage. It is shown in association with the third group of gaps 48c. All of the gaps 48c reside in a common vertical plane. Located on the framework which supports the two top rails 16 and 18 is a flat plate 60 on which is mounted an electromagnet 62. This electromagnet 62 has a pivoted armature 64 which normally is held in an elevated position by a tension spring (not shown) but which is pulled downward when the magnet coil is energized. The pivot point for armature 64 is indicated at 68. Secured to the armature 64 is an elongated finger 50a. This finger is the practical form of finger 50 illustrated in FIGS. 4, 5, and 6. The bottom end of finger 50a has two lateral extensions 72 so as to provide better trapping action with respect to a moving film chip 2E. The bottom end of finger 50a is located slightly downstream of the gaps 48c. The finger 50a is mounted and located so as to effect trapping of a chip 2E only when it is in down position.

Associated with the electromagnet 62 are two pairs of contacts. As seen in detail in FIG. 7 and schematically in FIG. 9, one pair comprises a fixed contact 76a and a movable contact 76b attached to armature 64. The second pair of contacts 78a and 78b is not visible in FIG. 7. However, it is to be understood that they are identical to contacts 76a and 76b respectively. Both pairs of contacts are normally open, as indicated in FIG. 9, and they close only when the magnet is energized.

Located below the bottom rail is a second electromagnet 84. This electromagnet has a pivoted armature 86 and attached to this armature is an elongated finger 88 having an offset portion 90 to which is attached a pusher element 52a corresponding to pusher element 52 of FIGS. 4–6. It is to be observed that the upper end of the pusher element 52a is notched on its upstream side so as to form a shoulder 92 against which the bottom end of a trapped chip will rest momentarily before being ejected.

Also associated with pusher magnet 84 is a third pair of normally closed contacts 94a and 94b. Contact 94a is fixed. Contact 94b is movable, being attached to armature 86.

Contacts 76 and 94 are connected in series between a suitable voltage supply 96 and the trap magnet 62. Contacts 78 connect voltage supply 96 with a time delay relay 98 and pusher magnet 84. Preferably, the same voltage supply 96 is connected also to an electric motor drive system 100 for retrieval belts 56 and 58. Alternatively the drive system may be powered from a different voltage supply. The drive system 100 is illustrated in block form for the reason that it may take the form of any one of a plurality of well-known and commerically available drive systems, e.g., a belt and pulley drive.

The trap electromagnet 62 is energized by the output from the logic system illustrated in FIG. 8 and hereinafter described. When magnet 62 is energized so as to thrust the finger 50a down into trapping position, it also causes closing of the contacts 76 and 78.

When contacts 76 close, a holding circuit is established for magnet 62 through normally closed contacts 94. Hence, although the pulse which energizes the trap magnet may be of relatively short duration, the magnet is kept on after the pulse has passed because of the holding circuit established through contacts 76 and 94. However, this holding circuit is interrupted when the pusher solenoid is energized since, when this occurs, the contacts 94 will open. Time delay relay 98 serves to provide a suitable time lag between closing of contacts 78 and opening of contacts 94. The reason for this time lag is to make sure that the selected chip has been trapped and has reached a vertical position so that the pusher element can push it up out of the gaps. Although not shown, it is also contemplated that the output signal from the logic circuit system of FIG. 8 may be passed through a variable delay device before application to the control circuit of FIG. 9, whereby to vary the time interval between generation of the signal and energization of the trap magnet. This will allow for variations in elapsed time between the moment a chip passes the read head and the moment it reaches the trap finger 50a, due to changes in air pressure, obstacles on the guide rails, poor fit between chip and rails, etc. Of course, where several traps are located in series along the guide rail system, a separate delay device may be provided for each FIG. 9 control circuit so as to permit adjustment of the operating times for each trap magnet.

Turning now to FIG. 8, there is illustrated the logic and control stages for the data processing system hereinabove described. The output from the transducer 40 (preferably a multichannel magnetic read head) is applied to a comparator system 104. The first stage in this system is a multichannel preamplifier 106 which converts the output of the read head to an amplified modified form suitable for use in a multichannel flip-flop stage 108. The latter provides an input to a coincidence comparator 110 which has a second input from an accession unit 112. The input from the accession unit 112 determines the character of the input required from the multichannel flip-flop 108 in order to produce an output from the comparator 110. An automatic reset unit 114 is provided to restore the multichannel flip-flop to a predetermined at-rest condition at the end of each code read from a passing data-bearing sheet.

The coincidence comparator 110 will produce an output each time a sheet bearing the correct identifying code passes the read head 40. The output from the comparator is applied to a flip-flop trigger circuit 116 which in turn generates a pulse that is applied to an extraction control circuit 120 of any suitable type but preferably of the type illustrated in FIG. 9. If the comparator 110 is a multichannel device, it will be able to check for a plurality of codes simultaneously. Thus, assuming that a first given code is detected, a multichannel comparator will produce a first output which is applied to a first coincidence flip-flop trigger circuit 116a. A different code sensed by the comparator will be applied to a second coincidence flip-flop trigger 116b. Similarly, a third desired code may be fed to a third trigger circuit 116c. These trigger units produce separate outputs which are applied to different extraction systems. Thus, the output from flip-flop trigger circuit 116a is applied to a first extraction control circuit 120a; the output from trigger 112 is applied to a second control circuit 120b; and the output from the third trigger is applied to a third control circuit 120c. Thus, with a system such as illustrated in FIG. 8, it is possible to remove data-bearing sheets having three different selected codes, with sheets having a first code being extracted through gaps 48a, the sheets having a second code being extracted through gaps 48b, and the sheets having a third desired code being extracted through gaps 48c (FIG. 3). Alternatively, all sheets having any one of the three selected codes could be removed through the same gaps, in which case all outputs of the comparator would be applied to a single extraction control circuit.

FIGS. 10 and 11 illustrate two other ways of trapping a travelling data-bearing sheet. In FIG. 10, the top tracks 16 and 18 are provided with swinging sections 16b and 18b on the downstream side of the gaps 48. Normally, these swinging rail sections will be in up position so that sheets may traverse the gaps without difficulty. However, on signal, these rail sections will swing down so as to trap a desired sheet. It is believed to be apparent that the rails may be operated by electromechanical means which are energized by the signal produced by a trigger circuit 116. In fact, the swinging rails may be operated by an armature or plunger-type electromagnet, just as trap finger 50a is operated by magnet 62.

In FIG. 11, the trapping is effected by a pair of pins 126, 128 which are located outside of and slightly above the top rails 16 and 18. These pins are attached to solenoids and are normally retracted so as not to interfere with chips speeding along the guide rails. However, on signal to the solenoids, these pins are moved inward far enough to obstruct the chips and cause them to swing to a vertical position where they can be pushed up out of the guide system by a pusher element 52.

Obviously, other means for trapping the film chip may also be devised. Similarly, the film chip may be extracted by other types of pusher elements. It is also to be appreciated that the belts 56 and 58 are not essential to the invention. Instead, they may be replaced by other retrieval mechanism.

It is also contemplated that the chips may be ejected in a downward rather than an upward direction. As shown in FIG. 12, a downward ejection stage comprises a set of gaps 48d, a trap finger 50b located below the bottom rails 20, 22, and a pusher element 52b which is located above the top rails 16, 18. Trap finger 50b and pusher element 52b are effective to extract chips from the rails only if the chips are oriented with their bottom ends in a leading position since the trap finger, pusher element, and the chips are in mirror image relation to their normal positions (FIG. 4). If the chips are oriented with their top ends in leading position, they cannot be extracted in a downward direction since their top ends will pass by the pusher element 52b before they can be trapped by finger 50b. Accordingly, before the chips reach the downward extraction stage, they must be flipped over so that their bottom ends are in a leading position. This is readily accomplished by providing gaps 48e in the top rails 16, 18 at a point located a suitable distance upstream of gaps 48d. On the downstream side of gap 48e there is provided another finger element 50c. This finger, like finger 50b, is movable up and down by a suitable means such as a magnet like magnet 62. Like fingers 50a and 50b, finger 50c is normally spaced from the rails a distance sufficient to permit the chips to pass freely along the guide rails. However, when it is moved toward the rails to a position corresponding to its position in FIG. 12, finger 50c will obstruct the top ends of the chips. Under the combined influence of finger 50c and the air stream, the plane of a chip (see chip 2F in FIG. 12) will pivot about a horizontal axis passing through the gaps in the two top rails. In pivoting the bottom end of the chip will slide along the bottom rails until it is leading the top end, as shown at 2G in FIG. 12. The finger is held down only momentarily, just sufficient for the chip to start flipping. Since the vertical height of the bottom notches 12 and 14 of a chip is only slightly greater than the corresponding dimension of the bottom rails, the chip will be limited with respect to the angle which it can assume relative to the rails. This angle is approximately the angle at which it is normally propelled. Accordingly, when the finger 50c is restored to its normal elevated position, the chip previously flipped under the influence of the finger will automatically slip back onto the top rails and resumes its travel along the rails (see chip 2H). Thereafter when the chip encounters finger 50b (as indicated at 2I), it will pivot until its top end strikes pusher 52b, at which point it will be ejected from the rails by a downward movement of the pusher. The ejected chip may be dropped into a bin or may be collected by a suitable retrieval mechanism such as belts 56a and 58a which operate in a manner similar to belts 56 and 58 of FIG. 7.

It is to be noted also that the invention is not restricted to the specific control circuit illustrated in FIG. 9 and that other circuits capable of performing the same control operations may be used without departing from the principles of the present invention.

Obviously, many modifications and variations of the present invention are possible in the light of the above teachings. It is to be understood, therefore, that the invention is not limited in its application to the details of

What is claimed is:

1. In a data processing system, a transport device for data bearing sheets comprising parallel guide means to edge support said sheets for movement therealong, said guide means having a discontinuity which is negotiable by said sheets when in a predetermined angular position relative to their direction of movement, means to alter the angular position of a selected one of said sheets, and means to disengage said one of the sheets from said guide means in the region of said discontinuity after its angular position has been altered.

2. In a data processing system comprising a plurality of guide rails and means for rapidly propelling data-bearing sheets along said guide rails, the improvement comprising a gap in each rail, means operative to stop a moving sheet in the region of said gaps, and means operative to remove a stopped sheet from said guide rails through said gaps.

3. In a data processing system comprising a plurality of guide rails for edge-supporting data-bearing sheets and means for creating an air pressure gradient along said rails whereby to rapidly propel said edge-supported sheets along said rails in a predetermined direction, the improvement comprising a section in each rail having a gap therein whose width is greater than the thickness of one of said sheets, and means for selectively removing sheets from said rails through said gaps.

4. The combination of claim 3 wherein said gaps are located in a common plane extending transversely of said rails at substantially a right angle to the longitudinal axes of said rails.

5. The combination of claim 3 wherein said last-mentioned means includes a first element movable into a blocking position relative to sheets moving along said rails and a second element for ejecting a blocked sheet from said rails through said gaps.

6. The combination of claim 5 wherein said first element is located on the downstream side of said gaps.

7. The combination of claim 5 wherein said second element is movable transversely of the normal path of movement of sheets on said rails.

8. The combination of claim 5 wherein said second element operates after said first element.

9. The combination of claim 3 wherein said gaps have the same width.

10. A data processing system comprising a plurality of parallel guide rails for edge-supporting data-bearing sheets each of which bears an identifying code; means for creating an air pressure gradient along said rails whereby to rapidly propel said edge-supported sheets along said rails in a predetermined direction; means defining a gap in each rail at a selected location; detector means for reading the code on each sheet as it travels along said rails; means for producing an output when a predetermined code is detected; and means responsive to said output for removing a sheet from said rails via the gaps therein.

11. A system as defined by claim 10 wherein said gaps are located downstream of said detector means.

12. A system as defined by claim 10 wherein said last-mentioned means includes an element operative to prevent sheets from jumping said gaps and continuing downstream on said rails.

13. A system as defined by claim 10 wherein said last-mentioned means includes a sheet-ejecting element disposed proximate to said gaps and movable transversely of said rails.

14. A system as defined by claim 10 wherein said last-mentioned means comprises a first sheet-trapping element and a second sheet-ejecting element.

15. A system as defined by claim 14 further including electromechanical means for operating said first and second elements in response to said detector output.

16. A system as defined by claim 10 wherein said detector means is adapted to produce a second output when a second predetermined code is detected, and further including means defining an additional gap in each rail at another selected location, and means responsive to said second output for removing a sheet from said rails via said additional gaps therein.

17. In a data processing system comprising a plurality of elongated guide means arranged to support a data-bearing sheet at an oblique angle to said guide means, and means for rapidly propelling said data-bearing sheet along said guide means at said oblique angle, the improvement comprising means operative to shift said data-bearing sheet to a new angle relative to said guide means.

18. The combination of claim 17 wherein said last-mentioned means is adapted to shift said data-bearing sheet from a first position wherein its top end leads its bottom end to a second position wherein said top end lags said bottom end.

References Cited in the file of this patent

UNITED STATES PATENTS

| | | |
|---|---|---|
| 1,597,438 | Ennis | Aug. 24, 1926 |
| 2,795,328 | Tyler | June 11, 1957 |